United States Patent [19]

Ivy

[11] Patent Number: 4,697,740
[45] Date of Patent: Oct. 6, 1987

[54] MIST GENERATOR WITH PIERCING MEMBER

[76] Inventor: Eugene W. Ivy, 3232 27th St., Port Arthur, Tex. 77642

[21] Appl. No.: 804,789

[22] Filed: Dec. 5, 1985

[51] Int. Cl.$^4$ .......................... B05B 3/04; B05B 3/06; A62C 31/22
[52] U.S. Cl. .................. 239/271; 239/222.19; 239/261; 239/264; 239/381; 169/70
[58] Field of Search ............ 239/222.17, 222.19, 239/251, 255, 261, 264, 271, 272, 380, 381; 411/493, 496, 499; 169/70

[56] References Cited

U.S. PATENT DOCUMENTS

| | | | |
|---|---|---|---|
| 540,218 | 5/1895 | Stanton et al. | 239/251 |
| 674,343 | 5/1901 | Oakes | 239/271 |
| 1,761,119 | 6/1930 | Gouldbourn | 411/496 |
| 2,246,797 | 6/1941 | Geddes | 239/271 |
| 2,413,083 | 12/1946 | Snowden et al. | 239/271 |
| 2,756,829 | 7/1956 | Phillips | 169/62 |
| 2,813,753 | 11/1957 | Roberts | 169/70 X |
| 2,896,861 | 7/1959 | Hruby | 239/237 |
| 2,979,272 | 4/1961 | Thorrez | 239/261 X |
| 2,990,885 | 7/1961 | Brazier | 169/1 |
| 3,082,960 | 3/1963 | Swan | 239/383 |
| 3,125,297 | 3/1964 | Copeland et al. | 239/261 |
| 3,424,250 | 1/1969 | Thomae | 169/15 |
| 3,713,587 | 1/1973 | Carson | 239/383 |
| 4,291,835 | 9/1981 | Kaufman | 239/11 |
| 4,582,255 | 3/1986 | Won | 239/222.19 |

Primary Examiner—Andres Kashnikow
Assistant Examiner—Patrick N. Burkhart
Attorney, Agent, or Firm—Glaser, Griggs & Schwartz

[57] ABSTRACT

A mist generating nozzle has a cylindrical bearing member in which a plurality of distribution slots are formed. A cylindrical sleeve member is concentrically disposed about the bearing member, with an annular chamber defined therebetween. The sleeve member has a plurality of orifices communicating with the annular chamber and which extend transversely with respect to the radius of the sleeve member for imparting rotational motion to the sleeve member in response to the discharge of water through the orifices. The centrifugal force acting on the water discharged through the orifices particulates the water droplets into a fine mist or fog, in a substantially spiral pattern around the nozzle. In another aspect of the invention, the mist generating nozzle is incorporated into a firefighting tool, which includes a piercing member for penetrating a building structure.

7 Claims, 10 Drawing Figures

MIST GENERATOR WITH PIERCING MEMBER

FIELD OF THE INVENTION

The present invention relates generally to fluid discharge nozzles, and in particular to a fluid discharge nozzle having a rotatable sleeve for producing a large volume of fog or mist.

BACKGROUND OF THE INVENTION

Spray discharge nozzles have many applications, including, but not limited to, firefighting and humidification. It is well known that water absorbs not only heat but also many of the toxic gases of a fire and tends to clear away the smoke and does so most effectively when broken up into a fine spray. Spray generating nozzles distribute the water discharge over a larger volume than do conventional fluid discharge nozzles wherein water is discharged in a converging pattern of diffused solid streams. Spray generating nozzles are particularly useful in combating interior fires and are often used to provide protection for firefighting personnel by creating a water spray shield around the firefighters.

DESCRIPTION OF THE PRIOR ART

Spray generating nozzles are known in the art. Such nozzles are typically comprised of a housing, a passageway for conducting water from a water source such as a fire hose from the inlet to the discharge end of the nozzle and a device for particulating the water to break it up into a fine stream. A plurality of openings are disposed on the discharge end of the nozzle for directly diffusing the discharge spray outwardly from the nozzle. A commonly used device for particulating water is an internal impeller, which turns in response to the flow of water across obliquely inclined impeller surfaces inside the housing.

One limitation of conventional spray generating nozzles is that a high pressure source of water must be available to provide sufficient carry for the discharge spray. Because the discharge nozzle outlet is substantially smaller than the supply hose in order to produce a diffused spray, a back pressure builds up within the nozzle housing, thereby limiting the discharge flow rate. The use of an internal impeller to particulate the water also requires mechanical bearings and the like, which increases the cost and mechanical complexity of the nozzle.

Another problem often encountered in firefighting operations is the problem of quickly and efficiently creating an entryway into the space in which the fire is located. For example, if a fire is located in the attic area of a house, it is customary to chop a hole in the roof using a fire axe, insert a water hose and spray the interior prior to entry by the firefighters. The process of creating an access opening in the roof is often time consuming and cumbersome, during which time the fire is likely to intensify.

OBJECTS OF THE INVENTION

It is, therefore, the principal object of the present invention to provide an improved mist or fog generating nozzle.

Another object of the invention is to provide an improved firefighting tool.

Still another object of the invention is to provide a fog generating nozzle which discharges a relatively large volume of water and distributes the discharge over a wider area than conventional nozzles.

Yet another object of the invention is to provide a fog generating nozzle in which back pressure is reduced within the nozzle.

A further object of the invention is to provide a fog generating firefighting tool having a piercing member for allowing the tool to be quickly and efficiently inserted into the interior of a building in which a fire is located.

A further object of the invention is to provide a fog generating nozzle which has a simpler construction and fewer mechanical parts than conventional spray nozzles.

SUMMARY OF THE INVENTION

These and other objects are accomplished in accordance with the present invention wherein a fluid discharge device for discharging a relatively large volume of fog or mist is provided. The discharge device includes a cylindrical bearing member closed at one end and open at the opposite end; means for connecting the bearing member to a fluid source; and a cylindrical sleeve member disposed concentric with and surrounding at least a portion of the bearing member and cooperating with the bearing member to form an annular chamber therebetween. The bearing member has a fluid passageway between the open and closed ends and a plurality of slots for allowing fluid entering the passageway to flow outwardly through the slots. The sleeve member has a plurality of orifices communicating between the annular chamber and the exterior of the sleeve member. The orifices extend transversely with respect to the radii of the sleeve member for imparting rotational motion to the sleeve member in response to the outwardly flow of fluid through the orifices, thereby particulating the fluid and discharging it as a finely divided fog or mist. When the annular chamber is pressurized, the fluid in the chamber serves as a bearing to support the sleeve member as it rotates with respect to the bearing member.

In one embodiment the slots are formed in a central portion of the bearing member, which is disposed between a first extension portion adjacent the closed end thereof and a second extension portion adjacent the open end thereof. The first and second extension portions both have a substantially greater diameter than the diameter of the central portion. The first and second extension portions limit the axial movement of the sleeve member by contacting respective opposite ends of the sleeve member to maintain it in alignment with and surrounding the central portion of the bearing member.

In another aspect of the invention the fluid discharge device is incorporated into a firefighting tool. The tool is comprised of a tubular shaft member having an open end; means for connecting the shaft member to a fluid source so that fluid is supplied to the fluid discharge device; and a piercing tool connected to the closed end of the bearing member for penetrating a roof or other support structure of a building to enable the fluid discharge device to be inserted into the building in the event of a fire.

In a preferred embodiment the piercing tool is shaped in the form of a truncated cylinder having an elliptically-shaped beveled surface. The intersection of the beveled surface and the non-truncated portion of the piercing member forms a relatively sharp edge to facilitate insertion of the piercing member through a roof or other support structure. The piercing member is preferably machined from stainless steel stock. The means for connecting the tool to a fluid source is a connector fitting integrally formed on the shaft member and having a longitudinal axis which extends transversely with respect to the longitudinal axis of the shaft member. The fluid discharge device, shaft member and connector fitting are also preferably comprised of a stainless steel material.

The centrifugal force associated with the rotation of the sleeve member particulates the fluid and discharges it outwardly in a substantially spiral pattern. Extended coverage is obtained from available high pressure supply mains, and because of the substantially reduced back pressure, a large delivery rate approaching the supply conduit flow rate is obtained. The use of a piercing member on the front end of a firefighting tool in which the fluid discharge device is incorporated enables the user to quickly penetrate a roof or other support structure to insert the fog generating nozzle to extinguish a fire and cool down the space prior to entry by firefighting personnel.

BRIEF DESCRIPTION OF THE DRAWINGS

Other objects and advantages of the invention will be apparent from the detailed description and claims when read in conjunction with the accompanying drawings wherein:

DETAILED DESCRIPTION OF THE PREFERRED EMBODIMENT

In the description which follows, like parts are marked throughout the specification and drawings, respectively. The drawings are not necessarily to scale and in some instances proportions have been exaggerated in order to move clearly depict certain features of the invention.

Figure 1:
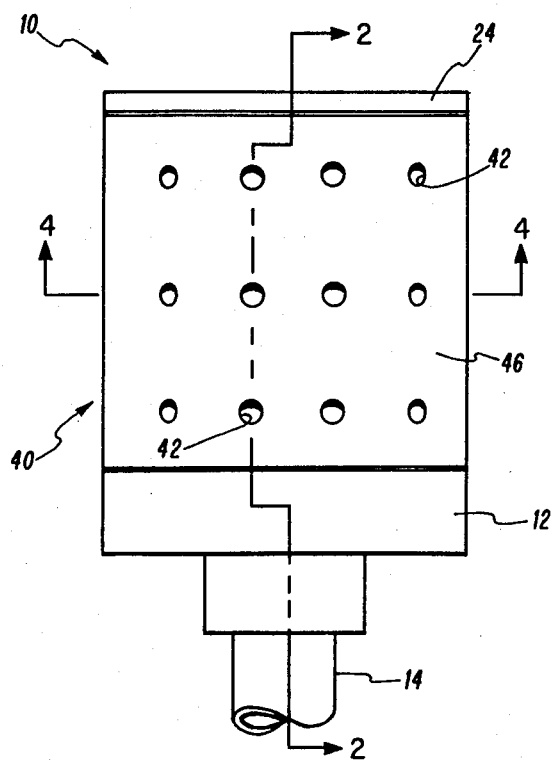
FIG. 1 is an elevational view of a fog generating nozzle constructed according to the present invention.
Figure 2:
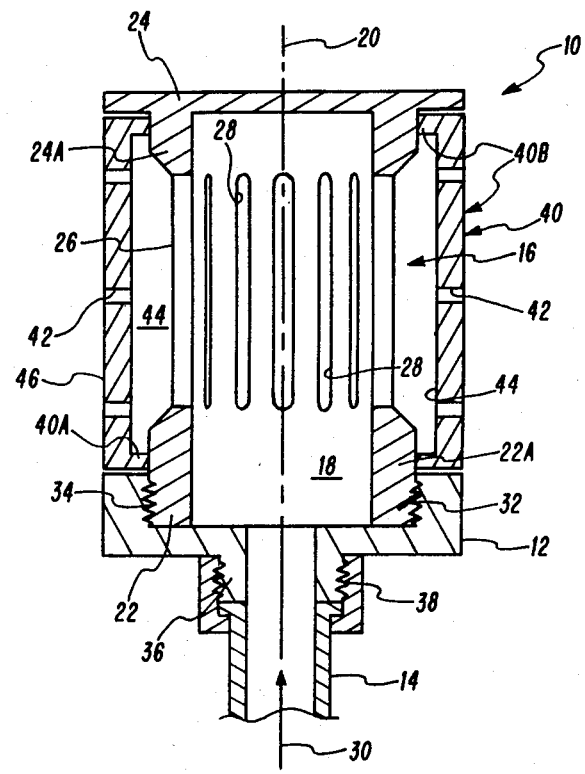
FIG. 2 is a sectional view of the nozzle of FIG. 1, taken along the line II—II.

Referring to FIGS. 1 and 2, a fog generating nozzle 10 according to present invention is threadly connected to a coupling member 12, which in turn is threadedly connected to a fluid conduit 14, such as a water pipe or hose. Water conduit 14 is adapted for connection to a supply main (not shown) for pressurizing nozzle 10.

Figure 5:
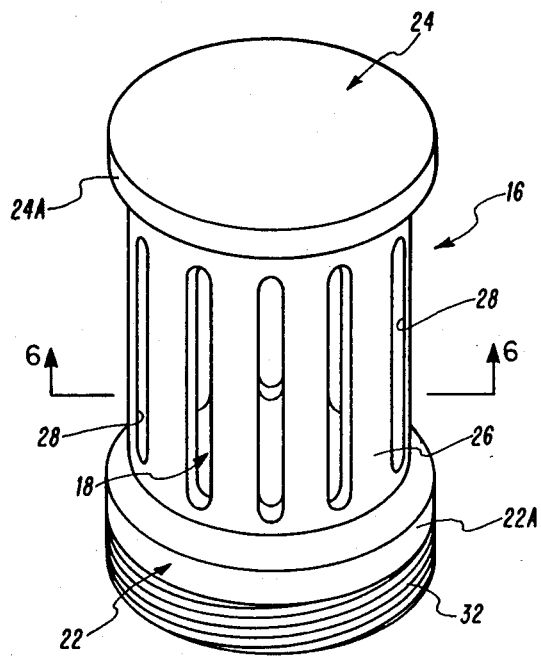
FIG. 5 is a perspective view of a bearing member component of the fog generating nozzle shown in FIG. 1.
Figure 6:
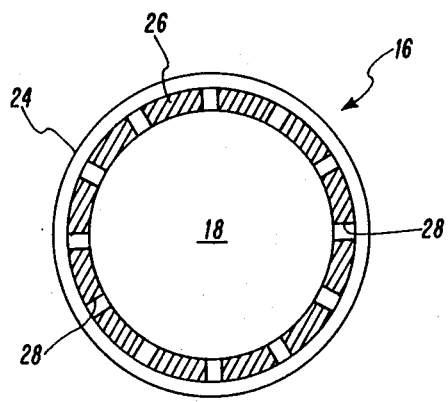
FIG. 6 is a sectional view of the bearing member component, taken along the line VI—VI of FIG. 5.

As can be seen in FIGS. 2, 5 and 6, nozzle 10 includes a cylindrical bearing member 16, having a fluid passageway 18 extending along axis 20 from a threaded base member 22 to a closed top member 24. A reduced diameter sidewall portion 26 of bearing member 16 has a plurality of axially extending distribution openings in the form of elongated slots 28 disposed at angularly spaced intervals thereon. The combined discharge area of the slots 28 exceeds the cross sectional area of supply conduit 14, thereby admitting pressurized water 30 into passage 18, virtually without imposing back pressure. Base portion 22 is threaded at 32 and functions as a male member for mating with corresponding threads 34 on a female end of coupling 12, as best seen in FIG. 2, to connect bearing member 16 to fluid conduit 14. The corresponding male end 36 of coupling 12 is threadedly connected at 38 to the corresponding female end of fluid conduit 14, as also shown in FIG. 2. Threaded base member 22 is open to admit water flow and is provided with a cylindrical shoulder extension 22A which connects the threaded base portion to the reduced diameter sidewall portion. Likewise, closed top member 24 is provided with a cylindrical shoulder extension 24A, connecting it to the reduced diameter sidewall portion.

Figure 3:
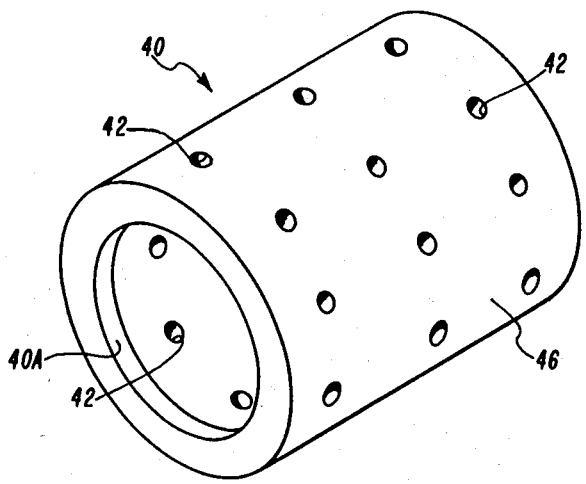
FIG. 3 is a perspective view of a rotor sleeve component of the fog generating nozzle shown in FIG. 1.
Figure 4:
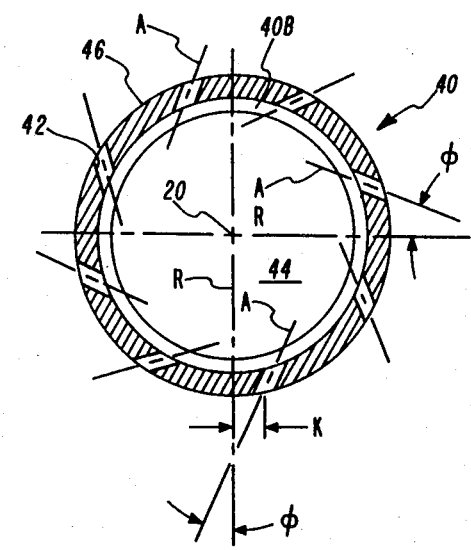
FIG. 4 is a sectional view of the rotor sleeve component, taken along the line IV—IV of FIG. 1.

Referring to FIGS. 2, 3 and 4, a rotor sleeve 40 cooperates with bearing member 16 to define nozzle 10. Rotor sleeve 40 is a hollow, cylindrically-shaped member having a plurality of orifices 42 which preferably are equally spaced along respective parallel lines of circumference around rotor sleeve 40. Orifices 42 extend transversely at an angle $\phi$ with respect to corresponding lines of radius R of rotor sleeve 40 so that a turning force is imparted to sleeve 40 when water is discharged through orifices 42. Angle $\phi$ is preferably equal to 30° as measured from the orifice axis A to the principal radius line R, with the orifice 42 offset from the radius R by an offset spacing K (K=¼ inch for R=1 inch).

Rotor sleeve 40 is positioned concentric with bearing member 16 and is rotatable with respect to bearing member 16. As best shown in FIG. 2, rotor sleeve 40 surrounds central portion 26 and slots 28 in their entirety and partially overlaps base member 22 and top member 24. Rotor sleeve 40 includes radial flange portions 40A, 40B which maintain sleeve 40 in generally concentric alignment with bearing member 16. Flange portions 40A, 40B are dimensioned to permit a slight amount of radial as well as axial end play. An annular chamber 44 is defined between bearing member 16 and rotor sleeve 40. When water 30 flows into passageway 18 under pressure, annular chamber 44 is pressurized with water to provide a water cushion upon which rotor sleeve 40 rides during rotation. Water flowing into passageway 18 will flow through slots 28 into annular chamber 44 and outwardly through orifices 42, thereby causing rotor sleeve 40 to rotate around bearing member 16.

The discharge of water 30 through orifices 42 creates a reaction force having a component which is tangential to the curved surface 46 of sleeve 40, as well as a component which is normal thereto. The tangential component imparts rotational motion to sleeve 40 in much the same manner that a jet engine turbine is turned by the reaction force produced by the flow of combustion gases through the engine nozzles. The centrifugal force associated with the rotation of rotor sleeve 40 breaks up the water particles into a fine mist or fog. The water particles travel outwardly in a substantially spiral pattern. Thus, the water particles are carried a sufficient distance to enable the nozzle 10 to be effectively used for firefighting purposes. Nozzle 10 discharges a greater volume of water than conventional nozzles (100 gallons per minute as compared to 65 gallons per minute for conventional convergent nozzles) and distributes the fog or mist discharge over a larger area. The improved GPM delivery is obtained because of the unusually low back pressure presented by operation of the cylindrical bearing and rotatable sleeve, and due to the absence of frictional loading associated with conventional mechanical roller bearing structures.

Figure 7:
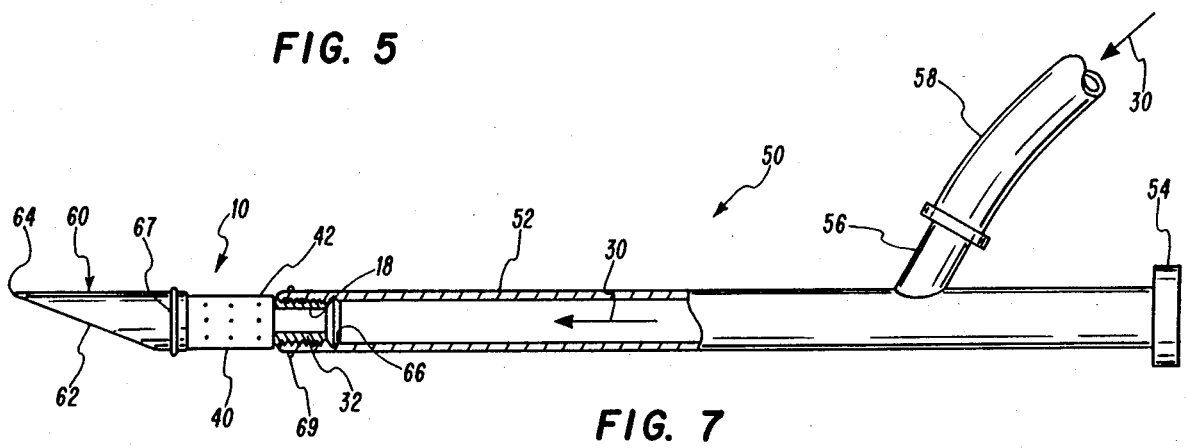
FIG. 7 is a side elevational view, partially broken away, of a firefighting tool constructed according to the present invention, having a piercing member and fog generating nozzle disposed thereon.
Figure 8:
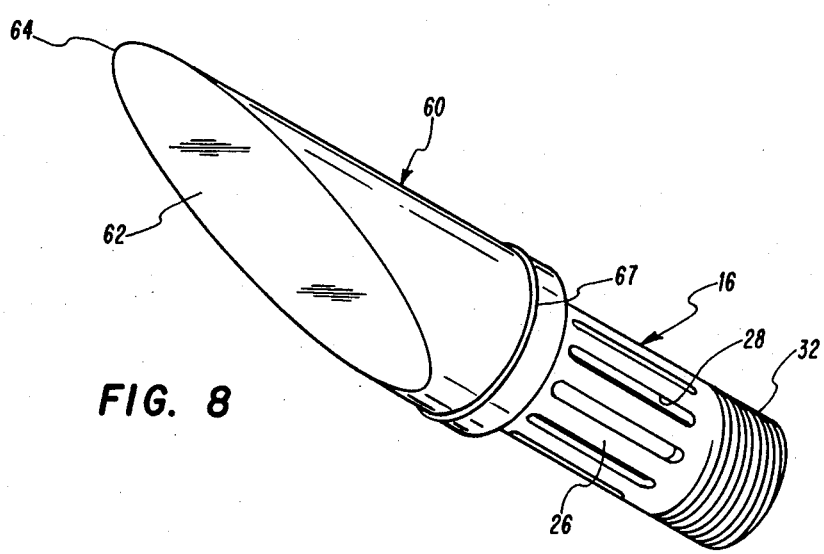
FIG. 8 is a perspective view of the piercing member and bearing member component of the nozzle as removed from the firefighting tool shown in FIG. 7.

According to another aspect of the invention, a firefighting tool 50 is depicted in FIGS. 7 and 8. Tool 50 is comprised of tubular shaft 52 having an impact cap 54 sealing one end thereof and a fitting 56 extending outwardly from shaft 52 for coupling engagement with a firehose 58 or the like. Mounted on the opposite end of shaft 52 are nozzle 10 and a piercing member 60, having a beveled face 62 to provide a relatively sharp edge 64 at the forward end of piercing member 60 to penetrate through a building structure such as a roof or wall. Impact cap 54 transmits the driving force from a sledge hammer for forcing the piercing member 60 through a brick wall or other such building structure.

The forward end of shaft 52 is equipped with female threads 66 for engaging corresponding threads 32 on bearing member 16, to couple nozzle 10 to shaft 52.

In one embodiment, piercing member 60 is integrally formed on the forward end of bearing member 16. In an alternate embodiment, bearing member 16 is equipped with male threads on or adjacent to top portion 24 for engaging corresponding female threads on piercing member 60. In both embodiments, nozzle 10 is disposed immediately behind piercing member 60 and flush with tubular shaft 52. According to this arrangement, nozzle 10 is protected from impact resulting from the initial penetration of piercing member 60 through a roof or other building support structure, and can be easily withdrawn.

Figure 10:
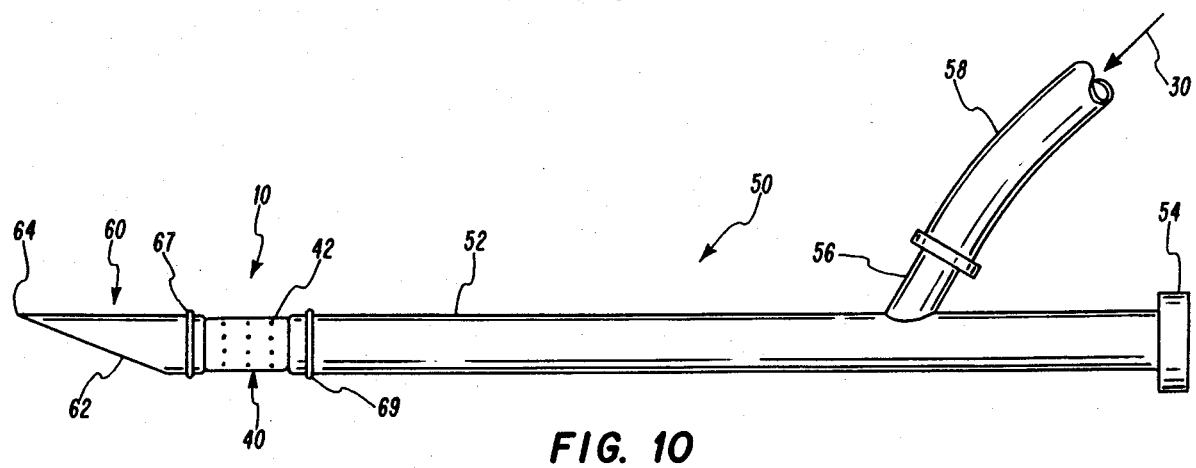

Referring to FIGS. 7, 8 and 10, expansion rings 67, 69 are formed onto the external surface of the piercing member 60 and the tubular shaft 52, respectively. Expansion rings 67, 69 are annular weld beads located immediately forward and aft of the rotor sleeve 40. Expansion ring 67 enlarges the opening in the building support structure during initial penetration of the piercing member 60, thereby minimizing scraping engagement of the building structure against the rotor sleeve 40. Expansion ring 69 serves the same purpose as the tool 50 is withdrawn from the building structure. According to this arrangement, the rotor sleeve 40 is protected against damaging impact force which might bend it and cause it to become unbalanced.

Figure 9:
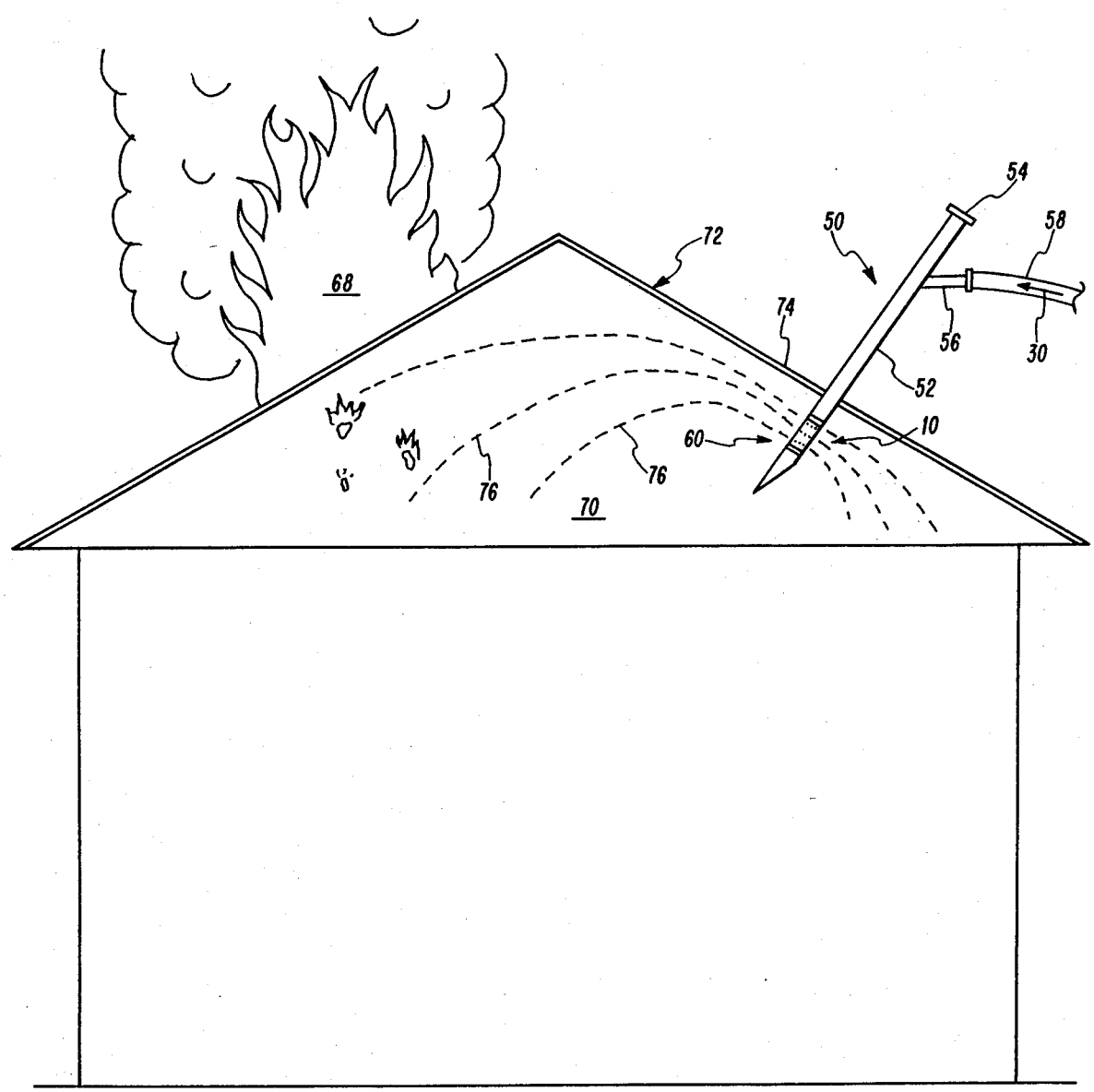
FIG. 9 illustrates the firefighting tool according to the present invention penetrating through the roof of a building and the nozzle discharging water in the form of fog or mist into the attic space.

Referring to FIG. 9, firefighting tool 50 is effectively used to combat a fire 68 located in the attic space 70 of a building. Tool 50 can be quickly inserted into the attic space 70 by thrusting the piercing member 60 downwardly against the roof structure surrounding the space, such as a roof 74, so that edge 64 penetrates through roof 74 and into the attic space 70. Tool 50 is inserted far enough into the attic space to allow nozzle 10 to discharge a large volume of water droplets in the form of fog 16, as described above.

Because of the particulated nature of the discharged water droplets, the heat in the space will cause approximately 80% of the water droplets to flash to steam, thereby removing heat from the fire by increasing the temperature of the discharged water droplets 76 to the flash point and by latent heat of vaporization which causes the water droplets to make the transition to the vapor state. For example, one cubic foot of water will produce approximately 1700 cubic feet of steam. The resulting steam forms a blanket within the space, which reduces the amount of oxygen available so as to "choke off" the fire. Moreover, the fog and steam propogate throughout the attic and into spaces which otherwise could not be reached. Even if the fire cannot be completely extinguished, the space will be cooled down sufficiently to allow personnel to enter the space with additional hoses and firefighting equipment to extinguish the fire.

One skilled in the use of fire fighting equipment will appreciate that the fire fighting tool 50 of the present invention can quickly and efficiently penetrate a roof or wall surrounding the space in which a fire is located so as to eliminate the conventional procedure of chopping a large hole in the roof or wall to provide access to the fire. The conventional procedure of chopping a hole in the roof or wall surrounding the space not only causes delays, during which time the fire may rage out of control, but also may endanger fire fighting personnel because of the rapid escape of flames, smoke and hot combustion gases through the access opening. Piercing member 60 is adapted to penetrate a structural surface such as roof 74 in such a manner as to produce a relatively small, clean opening therein, which is sufficiently large to admit tool 50 without allowing a substantial amount of smoke, flames and hot combustion gases to escape.

One skilled in the art will recognize that the fog generating nozzle of the present invention has many applications in addition to portable fire fighting equipment. For example, nozzle 10 may be coupled to a rigid water pipe or flexible water hose and installed in a central location within a greenhouse or other enclosure in which humidity control is desired. Nozzle 10 may be pressurized periodically, as desired, to discharge a large volume of fog or mist which will propogate throughout the enclosure to maintain a desired humidity level. Moreover, a system of nozzles 10 can be installed in a building structure as an integral part of an automatic fire extinguishing system.

Various embodiments of the invention have been described in detail. Since changes in and modifications to the above-described preferred embodiment may be made without departing from the nature, spirit and scope of the invention, the invention is not to be limited to said details, except as set forth in the appended claims.

What is claimed is:

1. An improved nozzle assembly comprising, in combination:
a bearing member having a tubular sidewall closed at one end and open at the opposite end, said tubular sidewall defining a fluid passageway and having a distribution opening formed in said sidewall for allowing fluid entering said passageway via the open end to flow outwardly through said sidewall;
a rotor sleeve disposed for rotation about said bearing member and radially spaced therefrom defining an annular chamber therebetween, said rotor sleeve having a plurality of discharge orifices formed through said sleeve and communicating with said annular chamber, said rotor sleeve including first and second annular flange members attached to said sleeve at opposite end portions thereof, respectively, said first and second annular flange members projecting radially inward toward said bearing member and radially spaced therefrom; and, first and second annular shoulder members attached to said bearing member on opposite end portions thereof, respectively, said first and second annular shoulder members being axially spaced from said first and second annular flange members, respectively, the axial spacings between the bearing shoulders and sleeve flanges defining first and second radially extending, annular flow passages, and said radial spacings between the annular flanges and said bearing member defining first and second axially extending annular flow passages, each axially extending annular flow passage being in communication with said annular chamber and one of said radially extending flow passages, said annular flanges and shoulder members limiting axial and radial movement of said rotor sleeve relative to said bearing member while permitting flow of pressurized fluid from said rotor chamber through said first and second radial flow passages simultaneously with the flow of pressurized fluid from said rotor chamber through said discharge orifices, whereby pressurized fluid flowing through said rotor chamber defines a radial fluid bearing and pressurized fluid flowing through said first and second radially extending flow passages defines first and second axial fluid bearings.

2. An improved nozzle assembly as defined in claim 1, said bearing member having a first extension shoulder adjacent to the closed end thereof and a second extension shoulder adjacent to the open end thereof, said first extension shoulder and said second extension shoulder each having a diameter substantially greater than the diameter of said tubular sidewall central portion, said central portion being disposed between the first and second extension shoulders.

3. An improved nozzle assembly as defined in claim 2, wherein said first and second extension shoulders limit axial displacement of said sleeve member in response to axial movement thereof, thereby maintaining said sleeve member substantially in alignment with the central sidewall distribution portion of said bearing member.

4. An improved nozzle assembly as defined in claim 1, wherein said distribution opening comprises a plurality of axially extending, angularly spaced slots formed in said bearing member sidewall.

5. An improved nozzle assembly as defined in claim 1, wherein said orifices are disposed at predetermined locations around said sleeve member, each orifice extending through said sleeve member at an acute angle as measured from the orifice axis to a radius line of said sleeve member.

6. A fire fighting tool comprising, in combination:
a tubular shaft having first and second end portions and a sidewall enclosing a flow passage, a discharge port formed in one end of said tubular shaft, and an inlet port formed in said sidewall between said first and second shaft end portions for admitting pressurized water;
a water discharge nozzle assembly attached to said shaft in communication with the discharge port of said shaft, said water discharge nozzle having a rotary member for discharging water radially outwardly from said shaft;
piercing means connected to said nozzle assembly for penetrating a building structure and simultaneously inserting said nozzle assembly into the building structure;
an impact cap mounted on the opposite end of said shaft for transmitting a driving impact force from a sledge hammer or the like for causing said piercing means to penetrate a building structure; and,
expansion means carried by said shaft for enlarging an opening in a building structure or the like during foreceable penetration of said piercing means into or withdrawal from a building structure, said expansion means comprising a first annular ring formed on said piercing means at a location forward of said water discharge nozzle assembly, and a second annular ring formed into said tubular shaft at a position aft of said water discharge nozzle assembly.

7. A fire fighting tool comprising, in combination:
a tubular shaft having first and second end portions and a sidewall enclosing a flow passage, a discharge port formed in one end of said tubular shaft, and an inlet port formed in said sidewall between said first and second shaft end portions for admitting pressurized water;
a water discharge nozzle assembly attached to said shaft in communication with the discharge port of said shaft, said water discharge nozzle having a rotary member for discharging water radially outwardly from said shaft, said water discharge nozzle including
a bearing member having a tubular sidewall closed at one end and open at the opposite end, said tubular sidewall defining a fluid passageway and having a distribution opening formed in said sidewall for allowing fluid entering said passageway via the open end to flow outwardly through said sidewall;
a rotor sleeve disposed for rotation about said bearing member and radially spaced therefrom defining an annular chamber therebetween, said rotor sleeve having a plurality of discharge orifices formed through said sleeve and communicating with said annular chamber, said rotor sleeve including first and second annular flange members attached to said sleeve at opposite end portions thereof, respectively, said first and second annular flange members projecting radially inward toward said bearing member and radially spaced therefrom;

first and second annular shoulder members attached to said bearing member on opposite end portions thereof, respectively, said first and second annular shoulder members being axially spaced from said first and second annular flange members, respectively, the axial spacings between the bearing shoulders and sleeve flanges defining first and second radially extending, annular flow passages, and said radial spacings between the annular flanges and said bearing member defining first and second axially extending annular flow passages, each axially extending annular passage being in communication with said annular chamber and one of said radially extending flow passages, said annular flanges and shoulder members limiting axial and radial movement of said rotor sleeve relative to said bearing member while permitting flow of pressurized fluid from said rotor chamber through said first and second radial flow passages simultaneously with the flow of pressurized fluid from said rotor chamber through said discharge orifices, whereby pressurized fluid flowing through said rotor chamber defines a radial fluid bearing and pressurized fluid flowing through said first and second radially extending flow passages defines first and second axial fluid bearings;

piercing means connected to said nozzle assembly for penetrating a building structure and simultaneously inserting said nozzle assembly into the building structure; and, an impact cap mounted on the opposite end of said shaft for transmitting a driving impact force from a sledge hammer or the like for causing said piercing means to penetrate a building structure.

* * * * *